J. A. GALLUP.
MILKING DEVICE.
APPLICATION FILED MAR. 24, 1908.
901,335.
Patented Oct. 20, 1908.
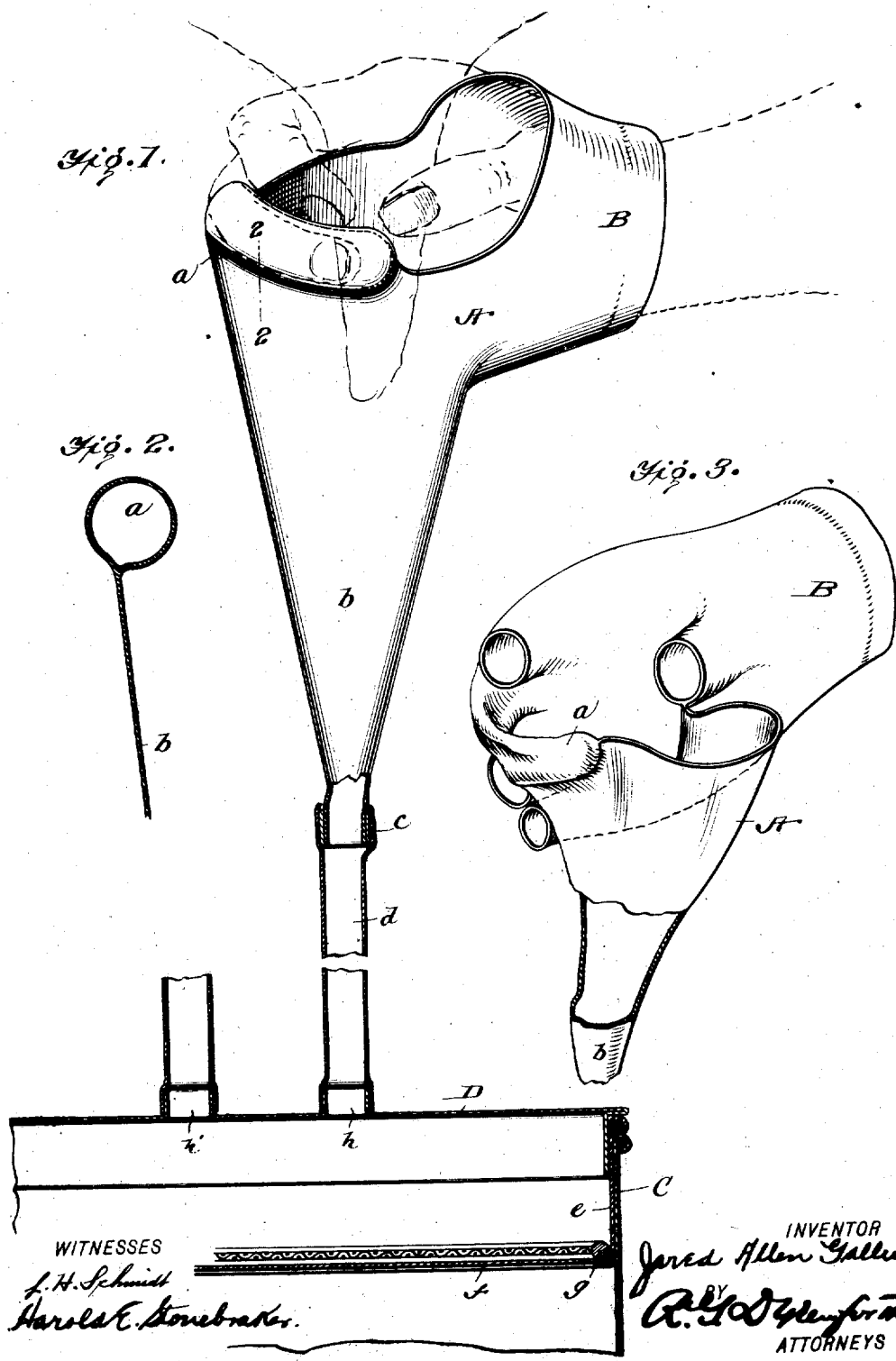

UNITED STATES PATENT OFFICE.

JARED ALLEN GALLUP, OF VOLUNTOWN, CONNECTICUT.

MILKING DEVICE.

No. 901,335.   Specification of Letters Patent.   Patented Oct. 20, 1908.

Application filed March 24, 1908. Serial No. 422,930.

*To all whom it may concern:*

Be it known that I, JARED ALLEN GALLUP, a citizen of the United States, residing at Voluntown, in the county of New London and State of Connecticut, have invented certain new and useful Improvements in Milking Devices; and I do hereby declare the following to be a full, clear, and exact description of the invention, such as will enable others skilled in the art to which it appertains to make and use the same.

My invention relates to certain novel and useful improvements in an apparatus for milking cows, and more particularly, it comprehends an attachment to go on the hand in such a manner as to protect the teat of the cow and the milk issuing therefrom from the surrounding atmosphere, and to convey the milk to a suitable receptacle.

It is a recognized fact that one of the most damaging effects produced in milk is that resulting from the particles of dust and dirt on the cow and in the barn or stable coming in contact with the milk as it falls into the receptacle in the usual milking process, it being in this way not infrequently infected with numberless deadly germs, and it is the purpose of my invention to obviate such a condition, and to convey the milk from the cow to a closed receptacle without permitting its coming in contact, to any serious extent, with the dirt, dust and bacteria of the surrounding atmosphere.

More specifically, the invention includes a device in the nature of a glove or mit adapted to be supported by and inclose the hand, the thumb and index finger being left free, and a pipe leading from such glove or mit to a suitable receptacle for receiving the milk.

With these several objects in view, my invention comprises the improved construction more fully described in the specification hereinafter, briefly set forth in the appended claims, and shown in the accompanying drawings, in which, Figure 1 is a perspective view showing the preferred form of my device in operative position. Fig. 2 is a sectional view on the line 2—2 of Fig. 1, and Fig. 3 is a perspective view of a slightly modified form of my invention.

Referring more particularly to the drawings, in which like reference characters refer to corresponding parts in the several views, A designates a mit or glove-like structure, which is preferably formed of a single piece of rubber or other flexible liquid-proof material. B is a band adapted to surround the wrist and hold the glove in proper position. Coöperating with the band B, is a pocket $a$, which receives the second finger of the hand, and serves to hold the protector well against the teat of the cow, while leaving the thumb and index finger free.

The lower part of the device comprehends a funnel-shaped portion $b$ which is provided at its end with a metallic reinforcing ring $c$. A rubber tube $d$ connects the lower portion $b$ with a bucket or suitable receptacle C, the construction of which I will now describe. Fitted within the top of the receptacle C is a strainer, including a flanged ring $e$ which is provided with a bottom $f$ of fine mesh wire. Supported on the bottom $f$ is a cloth-covered ring $g$, which serves as a further straining medium. D is the cover which is provided with the openings $h$, $h$ properly flanged to receive the other end of the aforementioned rubber tubing $d$. Two openings are provided to connect with both a left and right hand glove or mit such as described, and although I have shown only the right hand form, it is to be understood that they go in pairs, the left hand device being similar but reversely constructed from the form disclosed.

The modification shown in Fig. 3 is substantially like Fig. 1, except that it is more in the nature of a glove, openings being provided for all the fingers and thumb. The ends of the thumb and index finger still remain free, in this form as in the other.

It will be obvious that various changes and modifications may be made without in any sense departing from the purpose or spirit of my invention.

What I claim as new, and desire to secure by Letters-Patent, is:—

1. A device of the character described, including a glove-shaped hood for substantially inclosing the hand and fitting closely thereto, means for supporting the same on the hand comprising an integral, flat, wrist-encircling band, and a tube leading from the glove-shaped hood.

2. A device of the character described, including a glove-shaped hood for substantially inclosing the hand and fitting closely thereto, a teat-receiving opening in the top of the hood, an integral, flat, wrist-encircling band adjacent said opening, a pocket formed in the edge of the hood at a point opposite the wrist-encircling band, and a tube leading from said glove-shaped hood.

3. A device of the character described including a glove-shaped hood for substantially inclosing the hand and fitting closely thereto, openings in the hood for the thumb, first, third and fourth fingers, a teat-receiving opening in the top of the hood, an integral, flat, wrist-encircling band adjacent said opening, a pocket formed in the edge of the hood at a point opposite the wrist-encircling band, and a tube leading from the glove-shaped hood.

In testimony whereof, I affix my signature, in the presence of two subscribing witnesses.

JARED ALLEN GALLUP.

Witnesses:
CLARISSA C. JOHNSON,
HORACE CORODON CLEVELAND.